US010821556B2

(12) United States Patent
Foret et al.

(10) Patent No.: US 10,821,556 B2
(45) Date of Patent: Nov. 3, 2020

(54) METHOD FOR THE GENERATIVE PRODUCTION OF A 3-DIMENSIONAL COMPONENT

(71) Applicant: LINDE AKTIENGESELLSCHAFT, Munich (DE)

(72) Inventors: Pierre Foret, Munich (DE); Dominik Bauer, Germering (DE); Eric Hultstein, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 456 days.

(21) Appl. No.: 15/801,684

(22) Filed: Nov. 2, 2017

(65) Prior Publication Data

US 2018/0117713 A1    May 3, 2018

(30) Foreign Application Priority Data

Nov. 2, 2016    (EP) .................................. 16020429

(51) Int. Cl.
| | | |
|---|---|---|
| B23K 26/70 | (2014.01) |
| B22F 3/105 | (2006.01) |
| G01N 27/407 | (2006.01) |
| G01N 30/88 | (2006.01) |
| B33Y 10/00 | (2015.01) |
| B33Y 30/00 | (2015.01) |
| B23K 26/342 | (2014.01) |
| B23K 26/12 | (2014.01) |

(52) U.S. Cl.
CPC .......... *B23K 26/703* (2015.10); *B22F 3/1055* (2013.01); *B23K 26/123* (2013.01); *B23K 26/128* (2013.01); *B23K 26/342* (2015.10); *B33Y 10/00* (2014.12); *B33Y 30/00* (2014.12); *G01N 27/407* (2013.01); *G01N 30/88* (2013.01); *B22F 2003/1057* (2013.01); *B22F 2999/00* (2013.01); *Y02P 10/25* (2015.11)

(58) Field of Classification Search
CPC ...... B33Y 10/00; B33Y 30/00; B23K 26/342; B23K 26/703; B23K 26/123; B23K 26/128; B22F 3/1055; B22F 2999/00; B22F 2003/1057; B22F 2202/03; Y02P 10/295

See application file for complete search history.

(56) References Cited

U.S. PATENT DOCUMENTS

| | | | | |
|---|---|---|---|---|
| 5,348,592 A | * | 9/1994 | Garg ..................... | B22F 3/1007 148/208 |
| 6,998,097 B1 | * | 2/2006 | Nguyen .................. | B01D 8/00 422/168 |
| 2008/0254219 A1 | * | 10/2008 | Koh ..................... | B01J 37/0221 427/255.25 |

(Continued)

*Primary Examiner* — Ibrahime A Abraham
*Assistant Examiner* — John J Norton
(74) *Attorney, Agent, or Firm* — Millen White Zelano & Branigan, PC; Brion P. Heaney

(57) ABSTRACT

A method and apparatus for the generative production of a three-dimensional component in a processing chamber are disclosed. The method performs the steps of providing a metal starting material in the processing chamber and melting the starting material by inputting energy, which are repeated multiple times. A process gas is passed through the processing chamber in a circuit. Hydrogen is added to the circulating gas, then the circulating gas is heated to a temperature above 500 ° C. and then cooled to a temperature below 60 ° C.

16 Claims, 1 Drawing Sheet

(56) References Cited

U.S. PATENT DOCUMENTS

2014/0227527 A1* 8/2014 Brors .................. H01L 21/0262
                                                        428/411.1
2017/0304945 A1* 10/2017 Sutcliffe ................ B23K 26/12

* cited by examiner

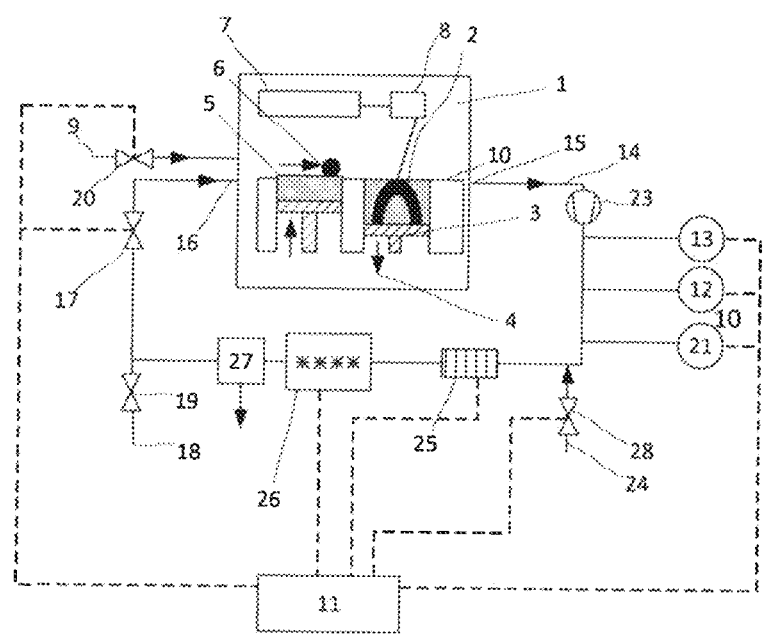

METHOD FOR THE GENERATIVE PRODUCTION OF A 3-DIMENSIONAL COMPONENT

CROSS REFERENCE TO RELATED APPLICATIONS

This application claims priority from European Patent Application EP 16 020 429.3 filed on Nov. 2, 2016.

BACKGROUND OF THE INVENTION

The present invention relates to a method for the generative production of a three-dimensional component in a processing chamber, wherein the steps of "providing a metal starting material in the processing chamber" and "melting the starting material by inputting energy" are repeated multiple times, wherein a process gas is provided in the processing chamber, and wherein a fraction of the process gas is extracted from the processing chamber, introduced into the circuit as circulating gas and returned to the processing chamber. The invention further relates to an apparatus for the generative production of a three-dimensional component, comprising a processing chamber with a structuring platform and an application device for depositing the starting material on the structuring platform, a laser for melting the starting material, a process gas feed device for feeding process gas into the processing chamber, wherein the processing chamber has an outlet and an inlet, and a circulation line which connects the outlet and the inlet.

Generative production methods can be used to produce an enormous variety of three-dimensional components with complex geometry.

For example, 3D printing is used to construct three-dimensional workpieces one layer at a time. Construction is carried out under computer control from one or more liquid or solid substances according to predefined dimensions and shapes (CAD). During construction, physical or chemical hardening or melting processes take place. Substances typically utilized for 3D printing are plastics, synthetic resins, ceramics and metals. 3D printers are used in industry and research. Applications also exist in the domestic and entertainment sectors and in art.

3D printing is a generative and/or additive production method. The most important techniques in 3D printing are selective laser melting and electron beam melting for metals and selective laser sintering for polymers, ceramic and metals, stereolithography and digital light processing for liquid synthetic resins, and polyjet modeling and fused deposition modeling for plastics and partly synthetic resins.

A further generative method is topical melting and solidification. In this method type, metal powder or metal wire is melted and solidified one layer at a time so that a three-dimensional component can be generated. The energy input by means of a laser beam is locally limited, so the size of the melt pool formed is small. This makes it possible to create very intricate structures. Corresponding methods are marketed commercially as Laser Engineered Net Shaping (LENS), Direct Metal Deposition (DMD), Laser Additive Manufacturing (LAM), Selective Laser Melting (SLM), Laser Metal Fusion (LFM) or Laser Metal Deposition (LMD).

In the case of local laser sintering of melting, a distinction is made between indirect and direct methods.

Selective Laser Sintering (SLS) is a method for creating spatial structures from a powdery starter material by sintering. Laser sintering is a generative layer construction method: the workpiece is constructed one layer at a time. In this way, the effect of laser beams can be used to produce any three-dimensional geometries, even with undercuts, e.g., workpieces which cannot be produced by conventional mechanical or casting manufacturing processes.

In selective laser sintering (SLS/LMF), a layer of powder material is deposited on a work surface (structuring platform). The loose powder is melted at specific points by a laser beam. In the process, the powder particles are bonded in the layer and with the layer below depending on the material used. For the purposes of producing metal components, a distinction is made between two basic development directions. Besides direct solidification of metallic powder materials by laser irradiation (direct metal laser sintering), the production of metal components by a combination of SLS of plastic-coated metal powder followed by thermal treatment (IMLS) became popular quite early.

In direct metal laser sintering (DMLS), metal materials consisting of either a single or multiple components are used. In particular, DMLS multicomponent powders consisting of various alloy elements are used. The low-melting component contained in the powder is melted with a laser beam and flows round the high-melting component, which serves as a support structure.

In electron beam melting (EBM), the workflow is substantially the same as that of the laser-based method. Selected sites of a loose metal powder are melted and then solidified in the desired shape in the powder bed or via a nozzle or wire. The energy required for this is provided by an electron beam. The method usually takes place in a negative pressure chamber flooded with inert gas.

Accordingly, in generative production methods a powder bed, a powder feed or a wire feed is used, wherein these starting materials are melted and then solidified again by the input of energy, for example by means of a laser beam, an electron beam or a plasma/electric arc. Inert or active gases are also used as the process gases in the generative production methods.

Generative production methods often take place in a processing chamber which is filled with a process gas. Normally, an inert gas is used for this, and the impurities in the gas must be strictly controlled. For example, the oxygen content must not exceed a certain threshold value. A further example of impurity is the moisture which is present in the processing chamber, which must also be strictly controlled.

The process gas is contaminated when the processing chamber is opened, for example. Ambient air enters the processing chamber during removal of a manufactured component followed by production of a new component. Another source of contamination is the powder itself, the particle surfaces of which may have absorbed impurities, which are then released during the melting process and contaminate the process gas atmosphere.

The object of the present invention is therefore to provide a generative production method with which it is possible to better control the process gas atmosphere in the processing chamber.

In particular, the invention is designed to enable better control of the oxygen content and/or the dewpoint of the process gas.

Some or all of these objects are solved by a method for the generative production of a three-dimensional component in a processing chamber, wherein the steps of providing a metal starting material in the processing chamber melting the starting material by inputting energy, are repeated multiple times, wherein a process gas is provided in the processing chamber, and wherein a portion of the process gas is extracted, forwarded in a circuit as a circulating gas, and returned to the processing chamber, characterized in that hydrogen is added to the circulating gas, the circulating gas is then heated to a temperature above the group consisting of above 500° C., above 600° C. and above 700° C., and the circulating gas is then cooled to a temperature below the group consisting of below 60° C., below 40° C. and below 20° C.; and an apparatus for the generative production of a three-dimensional component, comprising a processing chamber with a structuring platform and an application device for depositing the starting material on the structuring platform, a laser for melting the starting material, a process gas feed device for feeding process gas into the processing chamber, wherein the processing chamber has an outlet and an inlet and a circulation line which connects the outlet and the inlet, characterized in that a hydrogen feed is connected to the circulating line, wherein the hydrogen feed is connected to a hydrogen source, a heating device is provided downstream of the hydrogen feed connection for heating the circulating gas as it flows through the circulating line, and a cold trap is provided downstream of the heating device to condense the water out.

Advantageous variants are described in the subclaims,

SUMMARY OF THE INVENTION

According to the invention, a method for the generative production of a three-dimensional component in a processing chamber is suggested, wherein the steps of "providing a metal starting material in the processing chamber" and "melting the starting material by inputting energy" are repeated multiple times. In this way, the component is created one layer at a time.

In this context, a process gas is provided in the processing chamber. A part of the process gas is extracted from the processing chamber, introduced into the circuit as circulating gas and returned to the processing chamber.

According to the invention, hydrogen is now added to the circulating gas, and the circulating gas enriched with hydrogen is heated to a temperature above 500° C., above 600° C. or above 700° C. As indicated earlier, the process gas is often contaminated with oxygen, which gets into the processing chamber for example when the processing chamber is opened to remove a manufactured part or to place starter material in the chamber. At the temperatures described, a substantial fraction of the oxygen reacts with the hydrogen that has been introduced and/or is present in the circulating gas to form water. The oxygen content (and the hydrogen content) in the circulating gas may effectively reduced in this way.

However, the water vapor that forms in the reaction described above also interferes with the generative production process. Therefore, the circulating gas is then cooled to a temperature below 60° C., below 40° C. or below 20° C. Under these conditions, the water vapor in the circulating gas condenses until the water vapor partial pressure corresponding to the dewpoint is reached. The process of cooling the circulating gas is guided by how dry the circulating gas should be, that is to say how much residual water vapor can be allowed in the circulating gas without negatively impacting the manufacturing process. The more vigorously the process gas is cooled, the lower its dewpoint sinks and accordingly the smaller the fraction of water vapor that remains in the circulating gas.

In one embodiment of the invention, the circulating gas is cooled to a temperature below 0° C., below −30° C. or below −50° C. This may be implemented for example by passing the circulating gas through a cold trap containing liquid or solid carbon dioxide or liquid nitrogen.

An apparatus according to the invention for the generative production of a three-dimensional component comprises a processing chamber with a structuring platform and an application device for depositing the starting material on the structuring platform, a laser for melting the starting material, a process gas feed device for feeding process gas into the processing chamber, wherein the processing chamber has an outlet and an inlet and a circulation line which connects the outlet and the inlet. According to the invention, a hydrogen feed is connected to the circulating line, wherein the hydrogen feed is connected to a hydrogen source. A heating device is provided downstream of the hydrogen feed connection for heating the process gas as it flows through the circulating line, and a cold trap is provided downstream of the heating device to condense the water out.

The invention enables a controlled manufacturing process under defined conditions. Ambient air, and therewith also oxygen and moisture, can get into the processing chamber at points which are not airtight or with the supplied starting material, for example, and contaminate the process gas. Both oxygen and moisture have a harmful effect on the mechanical properties of the manufactured component. Moreover, particularly the quantity of moisture that is drawn into the processing chamber depends on the climatic conditions at the manufacturing site, for example the temperature and atmospheric humidity, or also on the nature of the powder or starting material used. Until now, the consequence of this has been that components manufactured using the same apparatus may manifest differing properties. According to the invention, this is prevented by the defined adjustment of the oxygen content and moisture in the process gas and the circulating gas. Defined manufacturing conditions may be set, so that components may be manufactured in reproducible manner.

For the purposes of the present invention, generative production is understood to mean the construction of a three-dimensional component one layer or level at a time using a powder bed, a powder feed or a wire feed, which serve as the starting material, and are melted by the input of energy, for example via a laser beam, an electron beam or a plasma or electric arc. In this context, reference is made to the generative production methods described in the introduction to the description (3D printing or in the case of solidification by chemical activators, melting and solidification (Laser Engineered Net Shaping (LENS), as Direct Metal Deposition (DMD) or as Laser Additive Manufacturing (LAM)), local sintering or melting (Laser Sintering (SLS)) Metal-Laser-Sintering (DMLS), Metal-Laser-Sintering (IMLS), Electron Beam Melting (ESM).

In a preferred embodiment of the invention, the oxygen content of the process gas is first determined, and then the quantity of hydrogen added to the circulating gas is adjusted depending on the calculated oxygen content. For this purpose, either the oxygen content of the process gas in the processing chamber or the oxygen content of the process gas in the in the circuit, i.e., the circulating gas, may be determined.

The invention enables the oxygen content to be reduced by reacting the existing oxygen with hydrogen to form water vapor and subsequently condensing the water vapor out. As explained in the preceding text, hydrogen is added to the circulating gas for this purpose. However, if more hydrogen is added than the oxygen in the process gas is able to react with, the residual hydrogen remains in the process gas. This residual hydrogen may have a negative effect on the manufacturing process and cause the manufactured components to become brittle, for example. Therefore, it is advantageous not to add more hydrogen than is needed to convert the oxygen present in the process gas. Ideally, a quantity of hydrogen not exceeding twice the calculated quantity of oxygen is added to the circulating gas, in keeping with the reaction equation $$H_2 + \tfrac{1}{2}O_2 \rightarrow H_2O.$$

Depending on which starting material is used for generative manufacturing and what kind of component is produced, hydrogen in the process gas can be more harmful than oxygen in the process gas. In this case, it is advantageous to introduce a quantity of hydrogen that is less than double that of the calculated oxygen content, particularly less than 90%, less than 80% or less than 70% of the calculated oxygen content into the process gas.

The oxygen content of the process gas may be determined by using an oxygen sensor. For this, a "lambda probe" may be used, for example. A lambda probe compares the oxygen content in the process gas with the known oxygen content of a reference gas. In this, use is made of the capability of certain ceramics to transport oxygen ions electrolytically. If one side of the ceramic is exposed to a reference gas and the other side of the ceramic is exposed to a process gas, a voltage is generated that is a measure of the difference between the partial oxygen pressures of the two gases. With a known reference gas, the oxygen content in the process gas can be calculated.

However, in many ceramics electrolytic conductivity only occurs at elevated temperatures, of 700° C. for example. Therefore, the lambda probe and the process gas are heated correspondingly for the measurement of the oxygen content. At 700° C., the oxygen in the process gas reacts with any hydrogen in the process gas to form water. This means that some of the oxygen reacts to form water during the process of measuring the oxygen content itself, and only a quantity of hydrogen corresponding to the remaining oxygen quantity needs to be added. However, this remaining oxygen content is exactly equal to the oxygen content quantity measured by the lambda probe.

It may happen that the process gas already contains a significant quantity of hydrogen. In such a case, if the quantity of hydrogen to be added to the circulating gas is only calculated on the basis of the oxygen content, there is a danger that too much hydrogen will be added, and consequently not all of the hydrogen can be converted to water vapor. It is therefore beneficial to determine the hydrogen content in the circulating gas as well as the oxygen content, and then to add a only enough hydrogen to the circulating gas so that the substance fraction of hydrogen in the circulating gas is not more than twice the substance fraction of oxygen in the circulating gas. This ensures that there is no residual hydrogen left in the process gas after the process gas has been heated, causing the hydrogen and oxygen to react to form water.

Advantageously, not only hydrogen but also an inert gas is added to the circulating gas. This additional supply of an inert gas promotes the mixing of the circulating gas with the hydrogen.

In another embodiment of the invention, the hydrogen is not added as a pure gas, but is added to the circulating gas as a mixture with an inert gas. The addition of a gas mixture containing hydrogen has the advantage that the quantity of hydrogen can be better regulated, particularly if only small quantities of hydrogen have to be added. For example, a gas mixture of 0.1 vol % or 1 vol % hydrogen in argon or in nitrogen is used for this.

The determination of the oxygen content in the process gas may be carried out directly in the processing chamber or outside of the processing chamber, particularly in the circulating gas. In the same way, the determination of the hydrogen content in the process gas may be carried out directly in the processing chamber or outside of the processing chamber, particularly in the circulating gas. It is equally possible to determine the hydrogen content and the oxygen content using different parts or samples of the process gas.

When the circulating gas enriched with hydrogen is heated, the hydrogen and oxygen react to form water vapor. This water vapor is then condensed out by cooling the circulating gas. The water formed during this condensation is preferably removed from the circulating gas. This may be done for example with the aid of a separator, for example a droplet separator.

The degree to which the oxygen and the hydrogen react to form water vapor is temperature-dependent. At low temperatures, this reaction takes place more slowly, and the reaction equilibrium is positioned more distinctly on the side of the educts hydrogen and oxygen than at higher temperatures, at which the reaction equilibrium shifts more towards the product water. It is therefore beneficial to regulate the heating of the circulating gas as a function of the oxygen content in the process gas. Such regulation may be determined by the oxygen content calculated before the circulating gas is heated and/or by the desired oxygen content after the circulating gas has been heated and the water vapor has condensed. For example, if a very low residual concentration of oxygen in the process gas is desired, it is advantageous to heat the process gas more strongly, thus forcing the conversion reaction into water, than if the acceptable concentration of oxygen in the process gas is less critical, meaning that higher values can be tolerated. The circulating gas is heated to a temperature above 500° C., above 600° C. or a temperature between 550° C. and 750° C., preferably between 600° C. and 700° C., for example.

The same applies for the cooling of the circulating gas. The degree of cooling, that is to say the temperature to which the circulating gas is cooled, may be regulated depending on the oxygen content determined and/or desired in the process gas.

In an alternative or additional embodiment of the invention, heating of the circulating gas and/or cooling of the circulating gas is regulated as a function of the dewpoint of the circulating gas. The notes above regarding regulation on the basis of the oxygen content apply similarly. In particular, the lower the desired hydrogen content and moisture in the process gas, the more vigorously the process gas is cooled. Of course, it is also beneficial to implement a regulation in which heating and/or cooling are adjusted or regulated as a function of the oxygen content and the dewpoint.

In a further embodiment of the invention, all or only a part of the circulating gas is returned to the processing chamber after the water vapor has been condensed out. If the oxygen content, the hydrogen content and/or the water vapor content in the process gas is too high, for example, a part of the circulating gas is rejected and replaced with inert gas, which is fed into the processing chamber.

Further parameters of the process gas or circulating gas may also be determined and optionally compared with a target value. The heating and/or cooling and/or additional feed of an inert gas or an active gas into the processing chamber may be regulated depending on the result of the comparison of the calculated value with the reference value.

One or more of the following parameters of the circulating gas is/are determined: hydrogen content, oxygen content, water vapor content, dewpoint, carbon content or temperature. Alternatively or additionally thereto, one or more of the following parameters is/are calculated for the process gas inside the processing chamber: hydrogen content, oxygen content, water vapor content, dewpoint, carbon content or temperature.

The gas stream that is returned via a circulating line or freshly added inert gas is introduced into the processing chamber via one or more inlets, wherein the inlets are preferably arranged in a lower area of the processing chamber. This serves to keep the process parameters stable, and homogeneous metallurgical effects can be achieved during production. In particular, it may be provided that at least some of the process gas is passed through the starting material which is present in the form of a powder bed. Due to the immediate proximity of the area in which the process gas enters the processing chamber to the powder bed and the processing location, a constant atmosphere is generated on the top layer of the component during the generative production of said component.

The method according to the invention may preferably relate to a laser melting method. The starting material is then melted locally by means of a laser beam.

The process gas provided is preferably an inert gas which has a greater density than air at the same temperature, e.g., argon. The inert gas may preferably be at a lower temperature than the temperature of the air which is initially present in the processing chamber. In both cases, the process gas collects in the lower area of the processing chamber where the processing also takes place. The heavier, gas-phase argon forces the lighter air, for example, into the upper region of the processing chamber, where e.g. an outlet is provided to allow the air to escape.

It is also possible to add reactive constituents, in particular reactive gases such as CO or $CO_2$, or gases with good thermal conductivity such as He to the process gas.

The process gas may be swirled in the processing chamber by means of at least one fan device. In this way, a homogeneous gas composition through the entire volume of the processing chamber is provided. The sample taken is thus a good representation of the composition of the process gas inside the processing chamber.

The oxygen content of the process gas is reduced in the manner suggested according to the invention. In one embodiment of the invention, a gas containing no oxygen is added to the circulating gas and/or the processing chamber, if the value of the oxygen content is still greater than a predefined comparison value after the reaction. In this way, the oxygen content in the process gas can be kept below a predefined maximum value in the processing chamber.

BRIEF DESCRIPTION OF THE DRAWINGS

The invention and further details of the invention will be explained in greater detail in the following text with reference to an embodiment thereof represented schematically in the drawing. In the drawing:

The FIGURE shows an apparatus according to the invention for three-dimensional manufacturing. The FIGURE is a schematic representation of an apparatus for carrying out the method according to the invention.

DETAILED DESCRIPTION OF THE INVENTION

In the following text, an apparatus for generative production of a three-dimensional component is described. As noted earlier, however, the method according to the invention is not limited to the apparatus represented for generative production of three-dimensional components.

The apparatus is a laser melting apparatus. The laser melting apparatus comprises a processing chamber 1 which serves as the construction space for the three-dimensional component 2.

A structuring platform 3 for supporting the component 2 to be produced is arranged inside processing chamber 1. Structuring platform 3 is equipped with a height adjustment device 4, by means of which the height of structuring platform 3 may be adjusted vertically.

Apparatus 1 further comprises a reservoir 5. Reservoir 5 is designed to hold a powder starting material which can be solidified.

Additionally, an application device 6 is provided for depositing the starting material on structuring platform 3. Such an application device 6 is movable horizontally, parallel to work level 10.

A laser 7 for generating a laser beam is also provided. A laser beam generated by laser 7 is deflected via a deflection mechanism 8 and focused through a focusing device (not shown) on a predetermined point immediately below or in work level 10. The path of the laser beam may be altered by deflecting mechanism 8 in such manner that it melts the locations of the deposited layer that correspond to the cross section of the object 2 that is to be produced.

A process gas feed device 9 is also provided, by means of which processing chamber 1 may be charged with a process gas.

Process gas feed device 9 is equipped with one or more reservoirs for the process gas or individual constituents of the process gas, wherein the process gas reservoir (not shown) is connected via one or more line segments to inlets (not shown) which open into the processing chamber. The inlets, e.g., one or more nozzles for introducing process gas are arranged in a lower region of processing chamber 1. The quantity of gas that is introduced may be regulated by means of a control valve 20. At least one nozzle of the process gas feed device is preferably arranged in the bottom region of processing chamber 1 or at a height equivalent to one fifth, one quarter, one half, two thirds or three quarters of the height between the bottom of processing chamber 1 and work level 10 or approximately level with work level 10.

An inert gas such as argon having greater density than air at the same temperature is preferably provided as the process gas.

A fan device (not shown) is also arranged in a bottom region of the processing chamber. Multiple fan devices may also be provided.

A circulating line 14 for a portion of the process gas is also provided. A portion of the process gas may be extracted from processing chamber 1 through an outlet 15, forwarded through circulating line 14 and returned to processing chamber 1 again through inlet 16. The circulation of the process gas is effected for example by means of a blower or compressor 23. A control valve 17 is also provided inside circulating line 14, by means of which the quantity of gas that is returned to processing chamber 1 is controllable. A line 18 is also provided which branches off from circulating line 14 and which makes it possible to draw off the process gas which is transported through circulating line 14. Line 18 is also fitted with a control valve 19.

The apparatus further comprises a controller 11 for controlling control valve 20 of process gas feed device 9 and control valves 17 and 19. Controller 11 may comprise one or preferably two regulating devices (not shown) with a closed control circuit. The regulating devices may also comprise a P-regulator, an I-regulator, a D-regulator and combinations thereof, such as a PID-regulator.

A measurement sensor 12 for determining the hydrogen content of the process gas circulating through circulating line 14 and a lambda probe 13 for determining the oxygen content of the process gas circulating through circulating line 14 are also provided. A further sensor 21 serves to determine the water vapor content or the dewpoint of the process gas circulating in the circuit. Measurement sensor 12, lambda probe 13 and sensor 21 are connected to controller 11.

A hydrogen feed 24 opens into circulating line 14, through which feed a gas mixture of inert gas and hydrogen may be fed into circulating line 14. Hydrogen feed 24 is fitted with a control valve 28, via which the quantity of gas introduced may be adjusted. Control valve 28 is also connected to controller 11.

A heating device 25 is provided downstream of the opening of hydrogen feed 24 to heat the circulating gas. Finally, a cold trap 26 is provided still further downstream to cool the circulating gas. Both the heating device 25 and the cold trap 26 are connected to controller 11 and may be actuated by controller 11.

The following text describes a method according to the invention with reference to an embodiment thereof.

Argon is fed into a bottom region of processing chamber 1 as the process gas. Since process gas feed device 9 introduces the process gas at the height of work level 10 or lower, processing chamber 1 is filled with the process gas from the bottom up.

Consequently, the heavier gaseous argon forces the lighter air into the top region of processing chamber 1, in which an outlet (not shown) is provided to allow the air to escape.

The process gas in processing chamber 1 may optionally be agitated by means of a fan device inside processing chamber 1. The turbulence has the effect of removing impurities from dead spaces in the processing chamber. It also creates a homogeneous gas composition throughout the entire volume of the processing chamber. Clean process gas may also be introduced into processing chamber 1 via process gas feed device 9.

A metal starting material is deposited or provided on structuring platform 3 in the form of a powder bed by application device 6. Alternatively, the metal starting material may also be introduced via a powder feed or a wire feed.

Then, the starting material is melted by means of laser 7. The two steps "providing a metal starting material on structuring platform 3" and "melting the starting material" are repeated multiple times so that the component is constructed layer by layer.

It has been found that the energy introduced with the laser 7 for melting the starting material decomposes water or water vapor present in the process gas into hydrogen and oxygen.

However, the oxygen content of the process gas should not exceed a predetermined maximum value throughout the manufacturing process in order to avoid undesirable oxidation reactions. The oxygen content of the process gas is therefore monitored according to the invention. For this, a sample of the process gas circulating through circulating line 14 is passed to lambda probe 13, and the oxygen content of the sample is determined by lambda probe 13. The oxygen content value obtained thereby is transmitted to controller 11.

Besides measuring the oxygen content, the hydrogen content of the process gas—i.e. the process gas circulating in the circuit—is determined. For this purpose, a second sample is drawn from the process gas and the hydrogen content therein is determined by means of a measuring sensor 12.

The second sample may be taken upstream or downstream of the point where the sample for determining the oxygen content is taken. It is also possible to use to the same sample for determining both the oxygen content and the hydrogen content.

The value for the hydrogen content calculated by measuring sensor 12 is also transmitted to controller 11. Then in controller 11, the additional quantity of hydrogen that would have to be fed to the circulating gas to achieve the right stoichiometry for converting hydrogen and oxygen into water is determined. Controller 11 adjusts control valve 28 so that no more than the quantity of hydrogen needed to achieve stoichiometric balance is introduced via hydrogen feed 24. The substance quantity fraction of hydrogen introduced via hydrogen feed 24 preferably consists of between 50% and 95% or between 60% and 90% or between 70% and 90% of the quantity of additional hydrogen required calculated beforehand.

The circulating gas enriched with hydrogen is then forwarded to heater 25 and heated to a temperature above 650° C. In this temperature range, hydrogen and oxygen react almost completely to form water vapor. The circulating gas 14 that exits heater 25 is thus essentially free from oxygen and hydrogen, but it does contain the water vapor which was formed during the conversion reaction.

Accordingly, circulating gas 14 is led to cold trap 26, where it is cooled vigorously enough to ensure that the water vapor in the circulating gas condenses out. Advantageously, circulating gas 14 is cooled to a temperature below 60° C., below 40° C. or below 20° C. The water which is condensed out is then separated from circulating gas 14 and removed from the circuit.

Moreover, some or all of the parameters including oxygen content, hydrogen content, water vapor content, and other parameters such as temperature, carbon content etc. may be determined in circulating line 14, either downstream or upstream of heater 25 and cold trap 26, or even directly inside processing chamber 1. The one or more measured values are advantageously also forwarded to controller 11 and used to regulate hydrogen feed 24, heater 25, cold trap 26, process gas feed device 9, control valve 17 and/or control valve 19.

LIST OF REFERENCE SIGNS

1 Processing chamber
2 Component
3 Structuring platform
4 Height adjustment device
5 Reservoir
6 Application device
7 Laser
8 Deflecting mechanism
9 Process gas feed device
10 Work level 11 Controller
12 Measuring sensor
13 Lambda probe
14 Circulating line
15 Outlet
16 Inlet
17 Control valve
18 Line
19 Control valve
20 Control valve
21 Water vapor measurement
22 Sensor
23 Blower
24 Hydrogen feed
25 Heater
26 Cold trap
28 Control valve

What we claim is:

1. A method for the generative production of a three-dimensional component in a processing chamber, comprising:
   (a) providing a metal starting material in the processing chamber, and
   (b) melting the starting material by inputting energy, wherein (a) and (b) are repeated multiple times,
   wherein a process gas is provided in the processing chamber, and wherein a portion of the process gas is extracted, forwarded in a circuit as a circulating gas, and returned to the processing chamber, said method further comprising:
   adding hydrogen to the circulating gas,
   heating the circulating gas to a temperature above 500° C., and
   then cooling the circulating gas to a temperature below 60° C.

2. The method according to claim 1, wherein the circulating gas is then cooled to a temperature below 0° C.

3. The method according to claim 1, wherein the oxygen content of the process gas or circulating gas is determined and that the quantity of hydrogen fed into that circulating gas is calculated on the basis of the determined oxygen content of the process gas or circulating gas.

4. The method according to claim 3, wherein a hydrogen substance quantity fraction introduced into the circulating gas does not exceed twice the determined oxygen content of the process gas or circulating gas.

5. The method according to claim 4, wherein the hydrogen substance quantity fraction introduced into the circulating gas is less than twice the determined oxygen content of the process gas or circulating gas.

6. The method according to claim 4, wherein the hydrogen content and the oxygen content in the circulating gas are determined, and then an amount of hydrogen is added to the circulating gas that does not exceed twice the determined oxygen content in the circulating gas is added to the circulating gas.

7. The method according to claim 1, wherein the hydrogen is added to the circulating gas together with an inert gas.

8. The method according to claim 1, wherein water condensing out of the circulating gas during cooling is removed from the circulating gas.

9. The method according to claim 1, wherein the heating of the circulating gas and/or the cooling of the circulating gas is regulated as a function of the oxygen content in the process gas.

10. The method according to claim 1, wherein the heating of the circulating gas and/or the cooling of the circulating gas is regulated as a function of the dewpoint of the circulating gas.

11. The method according to claim 5, wherein the hydrogen substance quantity fraction introduced into the circulating gas is less than 90% of the determined oxygen content.

12. The method according to claim 1, wherein the circulating gas is heated to a temperature above 600° C.

13. The method according to claim 1, wherein the circulating gas is heated to a temperature above 700° C.

14. The method according to claim 1, wherein the circulating gas is cooled to a temperature below 40° C.

15. The method according to claim 1, wherein the circulating gas is cooled to a temperature below 20° C.

16. A method for the generative production of a three-dimensional component in a processing chamber, comprising:
   (a) providing a metal starting material in the processing chamber, and
   (b) melting the starting material by inputting energy, wherein (a) and (b) are repeated multiple times,
   wherein, during (a) and (b), a process gas is provided in the processing chamber, and a portion of the process gas is extracted, forwarded in a circuit as a circulating gas, and returned to the processing chamber, said method further comprising:
   adding hydrogen to the circulating gas,
   heating the circulating gas to a temperature above 500° C., and
   then cooling the circulating gas to a temperature below 60° C.

* * * * *